UNITED STATES PATENT OFFICE.

THOMAS S. HARRISON, OF PHILADELPHIA, PENNSYLVANIA, ASSIGNOR TO HARRISON BROTHERS & CO., OF SAME PLACE.

IMPROVEMENT IN MANUFACTURE OF ALUMINOUS CAKE.

Specification forming part of Letters Patent No. 217,460, dated July 15, 1879; application filed April 4, 1879.

*To all whom it may concern:*

Be it known that I, THOMAS S. HARRISON, of Philadelphia, State of Pennsylvania, have invented a new and useful Improvement in the Manufacture of Fibrous Aluminous Cake, of which the following is a full description, and sufficient to enable those skilled in the art to which it belongs to practice the same.

My invention consists in the production of an improved fibrous aluminous cake, from which cake the silica has been removed, and into which cake has been introduced fibrous silicate of magnesia, or fibrous sulphate of lime, or their equivalent, or a mixture of these substances.

The material usually known as "aluminous cake" consists, essentially, of sulphate of alumina mixed with variable quantities of free silica, and is largely employed in the manufacture of paper. I find that for this purpose better results are obtained by substituting for silica one or both of the above-named substances, by reason of their fibrous nature, so that they become incorporated into the substance of the cake.

An objection to the use of common aluminous cake is, that during the process of making paper most of the silica which it contains is beaten out and lost, while if my improved aluminous cake be employed the silicate of magnesia and sulphate of lime (owing to the fibrous nature of these materials) are not beaten out, but are retained by becoming thoroughly incorporated with the paper itself.

I find the following to be a convenient method of carrying out my said invention. I first attack, at a suitable temperature, with the necessary quantity of sulphuric acid, (after any of the approved methods,) any earth or clay used for making alum or common aluminous cake. The amount of sulphuric acid required for each one hundred pounds of the aluminous material will vary with the quality of the earth or clay employed.

In the ordinary method of making aluminous cake a limited quantity of water is used in the process, and when the chemical action of the sulphuric acid and aluminous material is finished the contents of the vessel in which the operation has been carried on is essentially a hot solution of sulphate of alumina, in which is mechanically suspended silica set free from the aluminous earth or clay.

It is only necessary in the ordinary processes to run this hot liquid upon a metallic or other suitable surface, when hardening ordinary aluminous cake is the result.

In my process instead of running off the contents of the attacking vessel upon a cooling-surface, as above, I add a sufficient quantity of water to prevent the formation of a solid upon cooling. This liquid is then run off into settling-tanks, where the silica is deposited. After the liquid has become clear, it is run into a suitable vessel and evaporated to the density of 50° Baumé, more or less. It is then run out upon a metallic or other suitable surface and cooled to form a cake. This cake (which contains sulphate of alumina free from silica) is then reduced to as finely a divided condition as necessary by a mill or other machine, and thoroughly mixed with the required amount of fibrous silicate of magnesia or sulphate of lime, or a mixture of these substances, or they may be ground directly with the sulphate of alumina.

Another method that may be followed to produce my improved aluminous cakes is to add the silicate of magnesia or sulphate-of-lime, or a mixture of them, to the sulphate-of-alumina solution, then evaporate all together to the proper density to form a cake of the right consistency when cold. It is then only necessary to grind the cake or reduce it to the desired condition of fineness by any of the usual mechanical means, when the material will be ready for use.

The product which I produce, as described, I term "fibrous alum-cake," and its character is such as to adapt it specially to the wants of paper-making and similar uses.

Having thus described my invention, what I claim, and desire to secure by Letters Patent of the United States, is—

As a new article of manufacture, fibrous aluminous cake, substantially as set forth.

In testimony whereof I have hereunto signed my name this 2d day of April, A. D. 1879.

THOMAS S. HARRISON.

In presence of—
WM. C. WILSON,
JOS. C. HATIÉ.